Nov. 18, 1924.  1,516,418
H. P. WOODWARD ET AL
WHEEL LOCK
Original Filed March 6, 1922   2 Sheets-Sheet 1
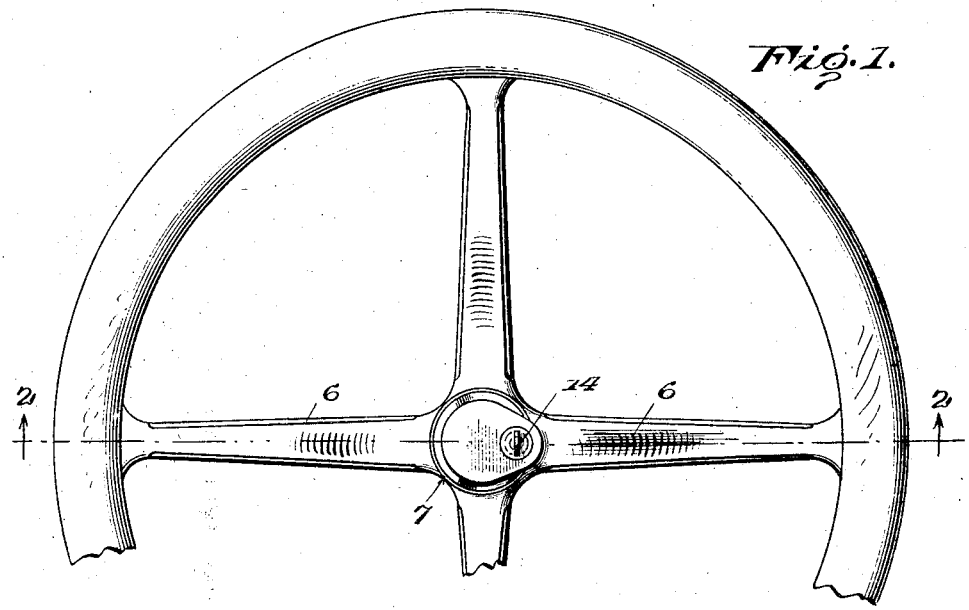
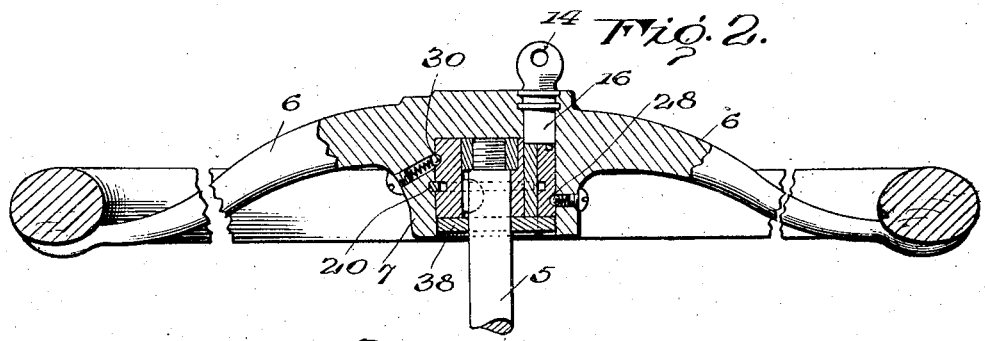
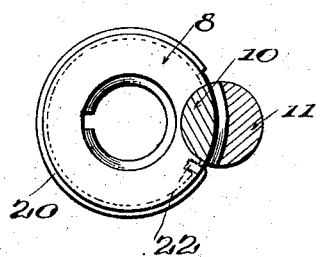
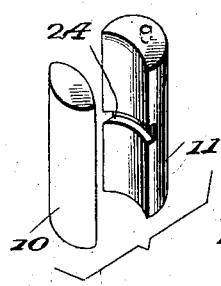
WITNESSES
INVENTORS
Harry P. Woodward
William A. Lowery
BY
ATTORNEYS Nov. 18, 1924.　　　　　　　　　　　　　　　　　　1,516,418
H. P. WOODWARD ET AL
WHEEL LOCK
Original Filed March 6, 1922　　2 Sheets-Sheet 2

WITNESSES

INVENTORS
Harry P. Woodward
William A. Lowery

ATTORNEYS

Patented Nov. 18, 1924.

1,516,418

UNITED STATES PATENT OFFICE.

HARRY PARK WOODWARD AND WILLIAM AMON LOWERY, OF ATLANTA, GEORGIA, ASSIGNORS TO THE MOTOR LOCK CO., OF ATLANTA, GEORGIA, A CORPORATION OF GEORGIA.

WHEEL LOCK.

Application filed March 6, 1922, Serial No. 541,375. Renewed February 15, 1924.

*To all whom it may concern:*

Be it known that we, HARRY P. WOODWARD and WILLIAM A. LOWERY, citizens of the United States, and residents of Atlanta, in the county of Fulton and State of Georgia, have invented certain new and useful Improvements in Wheel Locks, of which the following is a specification.

This invention relates to vehicle locks and more particularly to a locking device for the steering wheel.

An important object is to provide a steering wheel lock whereby the driving connection between the steering post or column and the wheel may be instantly broken so as to prevent the unauthorized use of the vehicle.

Another object is to provide a lock having reliable means whereby the steering wheel is positively connected to the steering post, so as to prevent accidents because of lack of control of the vehicle.

A further object of the invention is to provide a steering wheel lock which is of highly simplified construction, neat in appearance and cheap to manufacture.

Other objects and advantages of the invention will be apparent during the course of the following description.

In the accompanying drawings forming a part of this application and in which like numerals are employed to designate like parts throughout the same, Figure 1 is a fragmentary plan view of the improved lock.

Figure 2 is a detail sectional view through the lock.

Figure 3 is a plan view of a collar embodied in the invention, the sectional locking bolt also being shown.

Figure 4 is a group perspective of the sectional locking bolt.

Figure 5:
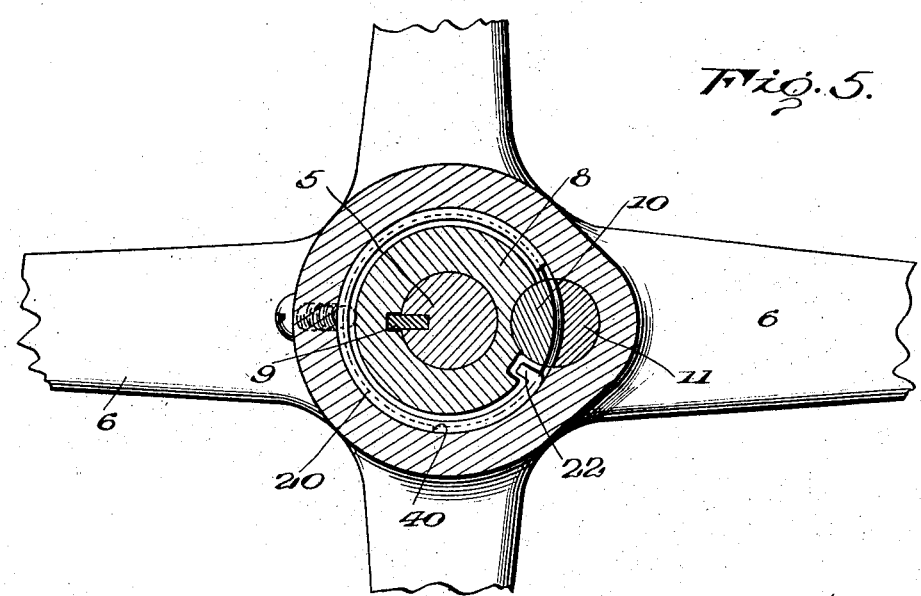
Figure 5 is a horizontal sectional view through the steering wheel, the view illustrating the locking bolt in a position to be turned whereby to lock the steering wheel to the collar.

In the drawing wherein for the purpose of illustration is shown a preferred embodiment of the invention the numeral 5 designates a steering post while the numeral 6 designates a steering wheel of any desired or well known type.

The hub 7 of the steering wheel is provided with a centrally arranged recess or socket which receives a collar 8, the said collar being secured to the steering post 5 by means of a key 9.

Specifically the invention resides in providing a driving connection between the collar 8 and the hub 7 by means of a locking bolt consisting of a pair of cooperating sections, the inner section being designated by the numeral 10 while the outer section is designated by the numeral 11.

Figure 6:
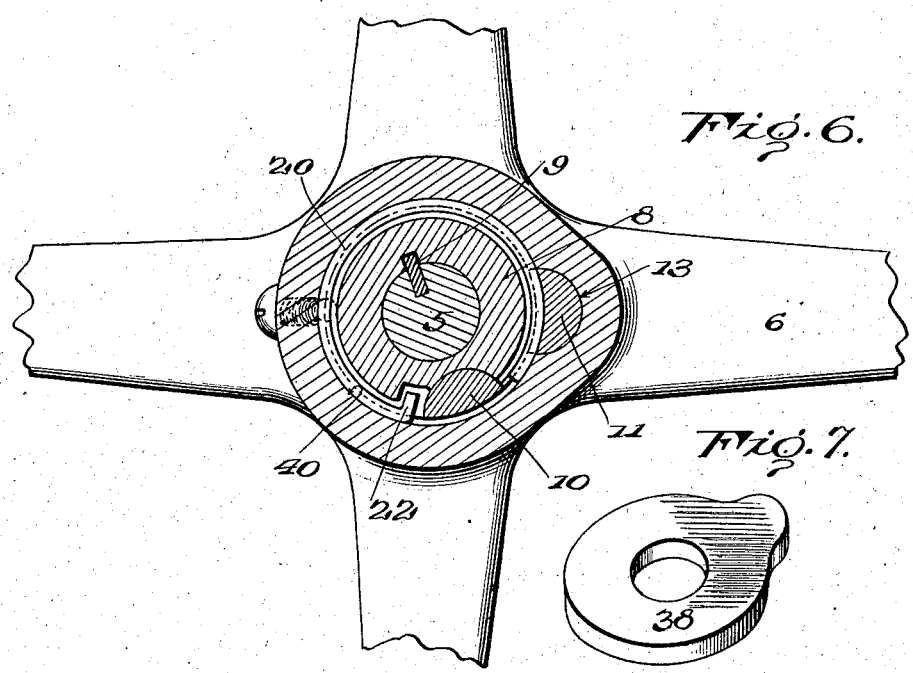
Figure 6 is a horizontal sectional view through the steering wheel, the view illustrating the several sections of the locking bolt spaced from each other.
Figure 7:
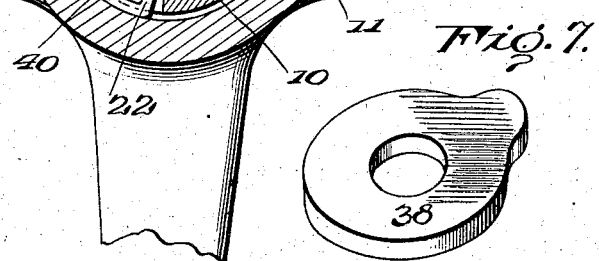
Figure 7 is a perspective of a washer embodied in the invention.

In carrying out the invention the collar 8 is formed in its periphery with a recess which snugly receives the inner section 10 of the locking bolt while the hub 7 is formed with a recess to receive the locking section 11. As illustrated in Figures 5 and 6 the inner section 10 has its outer side of convex formation and the inner section is of a cross sectional area sufficient to completely fill the recess in the collar 8.

On the other hand the inner face of the locking section 11 or that face which opposes the collar is of concaved formation and conforms to the curvature of the periphery of the collar 8. Also as illustrated in Figure 6 the section 11 is of the same cross sectional area as the recess 13 within which it is arranged. The sections 10 and 11 when assembled as illustrated in Fig. 5 form a cylinder which may be freely rotated within the recesses in the collar and the hub. A key 14 is extended into a lock 16 in the hub of the wheel, the cylindrical bolt formed by the sections 10 and 11 being a part of the lock so that when the key is rotated the cylindrical bolt will also be rotated. When the sections of the locking bolt are positioned as illustrated in Figure 5 the locking bolt may be rotated a quarter of a turn so as to establish a driving connection between the collar 8 and the steering wheel. On the other hand, when it is desired to break the driving connection between the steering wheel and the post the parts may be swung from the position illustrated in Figure 5 to the position illustrated in Figure 6 wherein it is illustrated that the sections 10 and 11 may be separated when the steering wheel is rotated with relation to the collar. This is the position the parts occupy when the steering wheel is locked against unauthorized use. That is to say the steering wheel cannot be operated when the sections of the bolt are in the position illustrated in Fig. 6.

The steering wheel is held in engagement with the collar by means of a split locking ring 20 seated in an annular groove in the periphery of the collar and having one end portion formed with an inwardly directed lug 22 which is received with a socket or notch in the collar. The inwardly directed lug 22 causes the split ring 20 to remain in a set position with relation to the collar at all times. Therefore, the inner section 10 which has a convex outer face does not in any way interfere with the split ring. However, the outer section 11 is provided with a transversely extending arcuate groove 24 to receive the split ring when the steering wheel is rotated with relation to the collar. As illustrated in Figure 6 the split ring is extended through the transverse groove 24 when the steering wheel is locked against unauthorized operation.

When the parts are in the position illustrated in Figure 5 a spring actuated locking ball 28 carried by the hub is received within a recess in the outer face of the section 11 whereby to hold the sections 10 and 11 in position. Also a spring actuated ball 30 is carried by the hub 7 on the side opposite the ball 28 and is received within a notch in the collar 8 whereby to hold the collar in position with relation to the hub 7. When the balls 28 and 30 are received within the notches a slight clicking will be caused for advising the operator that the steering wheel is in the proper position with relation to the collar and the locking bolt.

In operation the key 14 is inserted into the lock 15 for turning the locking bolt in the desired direction. When the bolt is positioned as illustrated in Fig. 5 the driving connection between the wheel and the collar may be either established or broken according to the desire of the operator and when the driving connection is broken and the key is removed the unauthorized use of the handle is absolutely prevented. The lock cannot be manipulated by the use of tools and further it is not easily broken. As illustrated in Figure 2 the washer 38 is received in the lower portion of the socket in the hub and serves to hold the collar in position. Incidentally the locking ring 20 is of spring metal and expands into an annular groove 40 in the hub 7 when the wheel is applied to the collar. Attention is directed to the fact that the cylindrical locking bolt completely fills the cylindrical opening defined by the recesses in the opposed sides of the inner and outer bodies. By reason of this construction "play" between the steering wheel and the steering post is absolutely prevented. Furthermore this arrangement renders it more difficult to pick the lock than would otherwise be the case, as it is not possible to "feel" the recess into which the locking bolt is adapted to be moved.

Figures 5 and 6 illustrate that the opposed sides of the locking sections 10 and 11 are curved transversely as they conform to the curvature and engage opposite sides of the body so that the sections are securely held within the corresponding recesses when the sections are separated. This is an important feature of the invention as it prevents the displacement of the sections.

It is to be understood that the form of the invention herewith shown and described is to be taken as a preferred example of the same and that such minor changes in arrangement and construction of parts may be made as will remain within the spirit of the invention and the scope of what is claimed.

Having thus described the invention, what we claim is:—

1. The combination with a steering wheel, of a post associated therewith, a post receiving collar arranged within the wheel, said collar and said wheel being formed in their opposed sides with recesses cooperating in the formation of a cylindrical opening, and a cylindrical locking bolt snugly received in said opening to rigidly connect the wheel and the collar and being split longitudinally to form a pair of separate sections, each of which occupies one of said recesses.

2. The combination of inner and outer bodies having their opposed sides formed with recesses defining a cylindrical opening when the recesses are opposite each other, a cylindrical locking bolt completely filling said opening whereby to rigidly connect the body, said bolt being split longitudinally to form separate sections, the opposed sides of which are curved transversely and flatly contact with the opposite sides of the body when the sections are separated whereby the sections are securely held in the corresponding recesses.

3. The combination with a post, of a member having a hub, a collar received in said hub, said hub and said collar being provided with recesses which cooperate in the formation of a cylindrical opening, a bolt received in said opening and split longitudinally to form separate sections, the opposed sides of which are curved transversely in the arc of the same circle and are adapted to flatly contact with the opposite part and a lock for controlling said sections.

he combination with a post, of a member having a hub, a collar received in said hub, said hub and said collar being provided with recesses which cooperate in the formation of a cylindrical opening, a cylindrical bolt received in said opening and consisting of separate sections, the opposed sides of which are curved transversely in the arc of the same circle and are adapted to engage the opposite part, a lock for controlling said sections, and a locking ring confined between said collar and said hub.

5. The combination with a post, of a member having a hub, a collar received in said hub, said hub and said collar being provided with recesses which cooperate in the formation of an opening, a bolt received in said opening and consisting of inner and outer separate sections, the opposed sides of which are curved transversely in the arc of the same circle, a lock for controlling said sections, and a spring actuated ball carried by said hub and adapted for engaging said collar whereby to detachably hold the same in position.

6. The combination of a hub, a collar arranged within the hub, a post extended into the collar, said hub and said collar being provided with recesses, a locking bolt received in said recesses and consisting of a pair of sections having their opposed sides curved transversely, and a locking ring movable with said collar whereby to connect the hub to the collar, one of the sections of said bolt being provided with a groove to receive said locking ring.

7. The combination of a hub, of a member arranged therein, said hub and said member being provided with recesses, a locking bolt having separate sections received in said recesses, the opposed sides of said sections being curved transversely and conforming to the curvature of said member, a locking ring of spring metal connecting the member and said hub and having an inwardly directed lug received in said member, said locking bolt being provided with means to permit of the passage of said ring, and means carried by the hub whereby to detachably hold the locking bolt in position.

8. The combination with a hub, of a member arranged therein, said hub and said member being provided with recesses, a locking bolt having separate sections received in said recesses, the opposed sides of said sections being curved transversely and conforming to the curvature of said member, a locking ring of spring metal connecting the member and said hub and having an inwardly directed lug received in said member, said locking bolt being provided with means to permit of the passage of said ring, means carried by the hub whereby to detachably hold the locking bolt in position, and a washer arranged in the lower portion of said hub and contacting with said locking bolt and said member.

9. The combination of inner and outer bodies having their opposed sides formed with recesses cooperating in the formation of a cylindrical opening, and a locking bolt completely filling said opening and being split longitudinally to form a pair of separate sections, the opposed sides of said sections being curved transversely along lines adapted to coincide with the curved opposing surfaces of the inner and outer bodies.

10. The combination of inner and outer bodies having their opposed sides formed with recesses cooperating in the formation of a cylindrical opening, a cylindrical locking bolt snugly received in said opening and being split longitudinally to form a pair of separate sections, the opposed sides of said sections being curved transversely along lines adapted to coincide with the curved opposing surfaces of the inner and outer bodies, and a locking ring surrounding said inner section and partially received in said outer section.

HARRY PARK WOODWARD.
WILLIAM AMON LOWERY.